(12) United States Patent
Feldmann et al.

(10) Patent No.: US 11,778,476 B2
(45) Date of Patent: *Oct. 3, 2023

(54) SYSTEMS AND METHODS FOR APPLICATION ACCESS CONTROL

(71) Applicant: Verizon Patent and Licensing Inc., Basking Ridge, NJ (US)

(72) Inventors: Valerie Feldmann, Morristown, NJ (US); Kevin Xu, Warren, NJ (US); Robert Belson, Rockville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,575

(22) Filed: Mar. 21, 2022

(65) Prior Publication Data
US 2022/0210655 A1 Jun. 30, 2022

Related U.S. Application Data

(63) Continuation of application No. 17/100,166, filed on Nov. 20, 2020, now Pat. No. 11,317,292.

(51) Int. Cl.
| | | |
|---|---|---|
| *H04W 12/63* | (2021.01) | |
| *H04W 12/08* | (2021.01) | |
| *H04W 4/02* | (2018.01) | |
| *H04W 12/37* | (2021.01) | |

(52) U.S. Cl.
CPC ........... *H04W 12/63* (2021.01); *H04W 4/025* (2013.01); *H04W 12/08* (2013.01); *H04W 12/37* (2021.01)

(58) Field of Classification Search
CPC ..... H04W 12/08; H04W 12/37; H04W 12/63; H04W 4/025
USPC ........................................................ 455/411
See application file for complete search history.

(56) References Cited

U.S. PATENT DOCUMENTS

| | | |
|---|---|---|
| 9,167,410 B1 | 10/2015 | Xue et al. |
| 2012/0303827 A1 | 11/2012 | Neystadt et al. |
| 2017/0010762 A1* | 1/2017 | Adams ................ G06F 3/04812 |
| 2017/0041454 A1 | 2/2017 | Nicholls et al. |
| 2019/0025992 A1 | 1/2019 | Ihrig et al. |

* cited by examiner

*Primary Examiner* — Joel Ajayi

(57) ABSTRACT

A system described herein may provide a technique for selectively granting or revoking/denying access to applications, services, data, etc. to a User Equipment ("UE") based on location-based policies and a network-determined location of the UE. The network-determined location may be determined by elements of a wireless network, such as a Mobility Management Entity ("MME"), Access and Mobility Management Function ("AMF"), or other suitable element.

20 Claims, 13 Drawing Sheets

SYSTEMS AND METHODS FOR APPLICATION ACCESS CONTROL

CROSS-REFERENCE TO RELATED APPLICATION

This application is a Continuation of U.S. patent application Ser. No. 17/100,166, filed on Nov. 20, 2020, titled "SYSTEMS AND METHODS FOR APPLICATION ACCESS CONTROL," the contents of which are herein incorporated by reference in their entirety.

BACKGROUND

Sensitive information, systems, devices, etc. may require user authentication in order to ensure that unauthorized users do not have access to such sensitive information, systems, devices, etc. For instance, a malicious user may obtain access to a critical network component in a network data center, which may interfere with the operation of a network, such as a wireless network, an Internet service provider network, etc. Further, an unauthorized user may obtain access to sensitive information, such as a company's proprietary information or other sensitive information, which may be a violation of security policies or non-disclosure obligations, or simply pose an increased risk for misuse.

DETAILED DESCRIPTION OF EXAMPLE EMBODIMENTS

Figure 1:
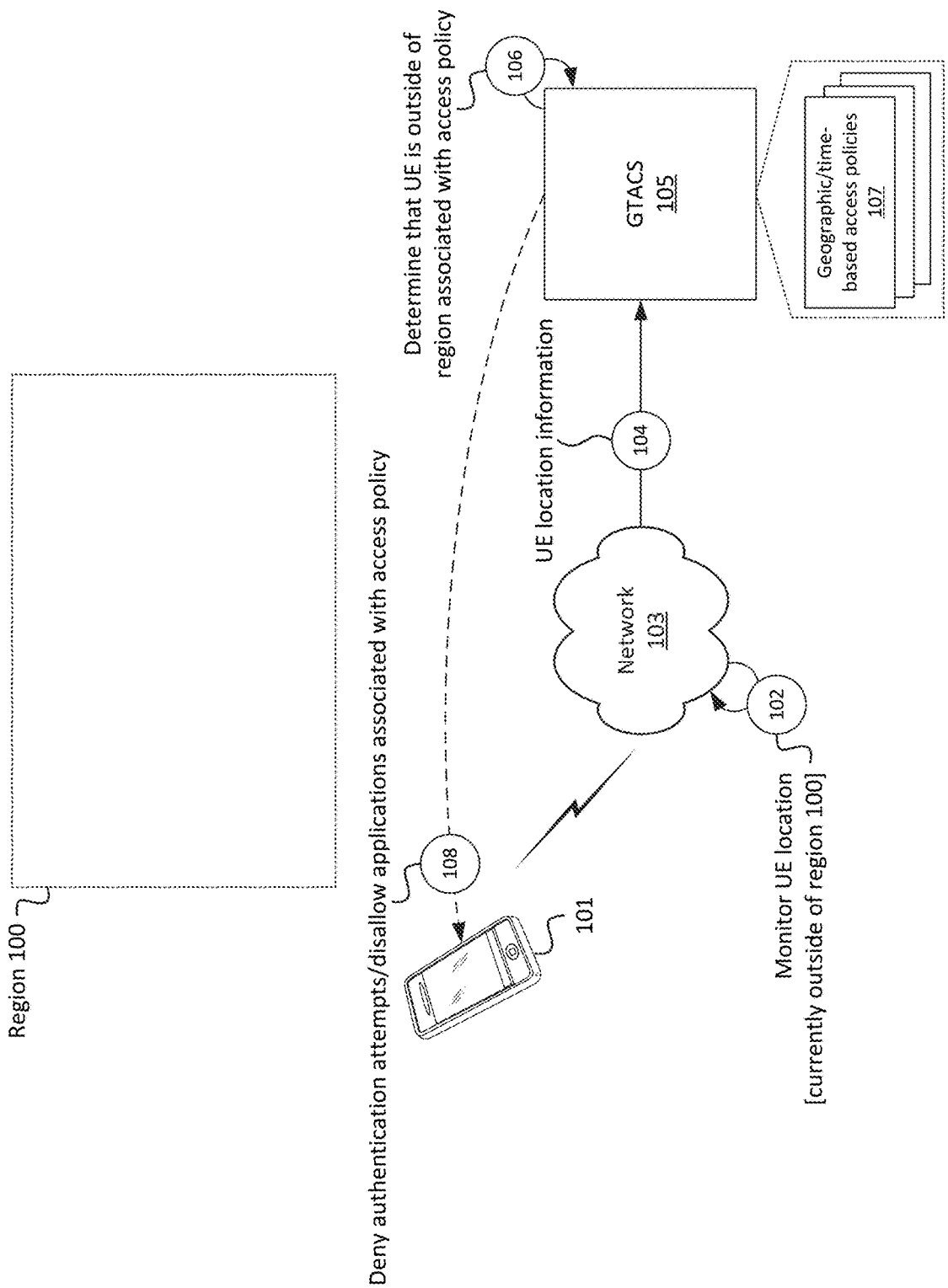
FIG. 1 illustrates an example of a Geographical- and Time-based Access Control System ("GTACS") of some embodiments monitoring a network-determined location of a User Equipment ("UE")

The following detailed description refers to the accompanying drawings. The same reference numbers in different drawings may identify the same or similar elements.

Embodiments described herein provide for geographic location-based access control for systems accessible to a User Equipment ("UE") device. For example, in accordance with embodiments described herein, access to applications, services, devices, information, networks, etc. may be provided to a UE based on a determined location of the UE. Location-based access control, in accordance with embodiments described herein, may be useful in situations where access to a particular application, service, device, network, etc. outside of a particular geographical location or region is undesirable, insecure, or the like. For example, a company, institution, etc. may allow access to internal or proprietary systems (e.g., applications, IoT systems, data centers, databases, etc.) to UEs that are located within a particular facility (e.g., a building in which such internal or proprietary systems are physically located), within a particular threshold proximity of such internal or proprietary systems (e.g., within about 100 meters or some other threshold proximity). On the other hand, such company, institution, etc. may block or degrade access to internal or proprietary systems to UEs that are located outside of a particular facility, outside of a threshold proximity of the internal or proprietary systems, etc. As further described herein, one or more other factors may be used in the location-based authentication techniques of some embodiments, such as policies associated with particular UEs or users, user roles, time-based policies, username and password authentication factors, biometric authentication factors, and/or one or more other factors.

As discussed herein, the "access" granted (or not granted) to a given UE may include the enabling or disabling of access to applications, services, devices, networks, etc., available at the UE. For example, the UE may be associated with a set of applications (or "apps") that are available for use (or available with full functionality). The applications may have components that are installed on the UE, and/or in some implementations may have components that are accessible to the UE via network connectivity and are hosted on an application server in or connected to the network. When the system has received an indication that the UE is within a location for allowable use of an application, it may make the application fully available for use by the UE, according to policies that require certain location, time, user, role or other requirements for access. Likewise, when the system receives an indication that the UE is not within a location for allowable use of an application, it may make the application unavailable for use (or available with limited functionality). Further description of example systems and methods that implement the foregoing are described below.

The applications, services, devices, networks, etc., that may be access controlled can include various systems local to and/or remote from the UE. In some embodiments, such systems include applications/services/devices executing (at least partially) at the UE. Such system may also include application/services/devices executing remotely from the UE, such as on/through remote systems accessible by the UE when the UE is communicatively coupled thereto via one or more networks (e.g., Software as a Service ("SaaS") applications, client/server applications, network-based applications, microservices, IoT devices and/or other applications/services/devices that include computations or other application functions performed by a remote device or system). For example, as discussed below, applications and services may be executed by an application server and/or some other suitable device or system, which in some implementations may be part of a Multi-Access/Mobile Edge Computing ("MEC") edge computing facility. In such scenarios, the UE may execute a "lightweight" or "thin" client application that performs local input and/or output functions, networking functions to communicate with a remote device or system, etc., and communicates with the remotely-executing application to provide the input/output related to the remotely-executing application.

The UE may be communicatively coupled to a wireless network (e.g., via a radio access network ("RAN"), such as a Long-Term Evolution ("LTE") RAN, a Fifth Generation ("5G") RAN, and/or some other type of RAN). The RAN and/or a core network (e.g., an Evolved Packet Core ("EPC"), a 5G Core ("5GC"), and/or some other type of core network) to which the RAN is communicatively coupled may include a network-based location determination facility comprising one or more devices or systems that may monitor or otherwise determine the location of UEs communicatively coupled to the RAN. Such devices or systems may include, for example, a mobility management system (e.g., a Mobility Management Entity ("MME"), an Access and Mobility Management Function ("AMF"), and/or some other device or system that performs operations related to intra-RAN or inter-RAN mobility for one or more UEs), a RAN base station (e.g., an evolved Node B ("eNB"), a Next Generation Node B ("gNB"), or some other type of base station), or some other suitable device or system. The location of the UE may be determined by the network (e.g., by the MME, AMF, base station, other network element, etc.) based on cell triangulation techniques, real-time kinematic ("RTK") techniques, and/or other suitable techniques.

UEs may also have location determination capabilities, such as using Global Positioning System ("GPS") techniques or other suitable techniques. The use of network-determined location for the UE, in accordance with some embodiments, may be more reliable, accurate, or secure than a UE-determined location of the UE. For example, malicious users may provide "spoofed" or otherwise inaccurate UE location information. In contrast, network-determined location information may be difficult or impossible for such malicious users to modify, spoof, etc., as a network may be able to determine a UE's position using RTK and/or other suitable techniques without needing UE-based information. In some embodiments, a combination of UE-determined location and network-determined location may be used to determine a location for the UE for purposes of applying an access control policy (for example, using the UE-determined location as a verification for the network-determined location, or vice-versa).

Figure 2:
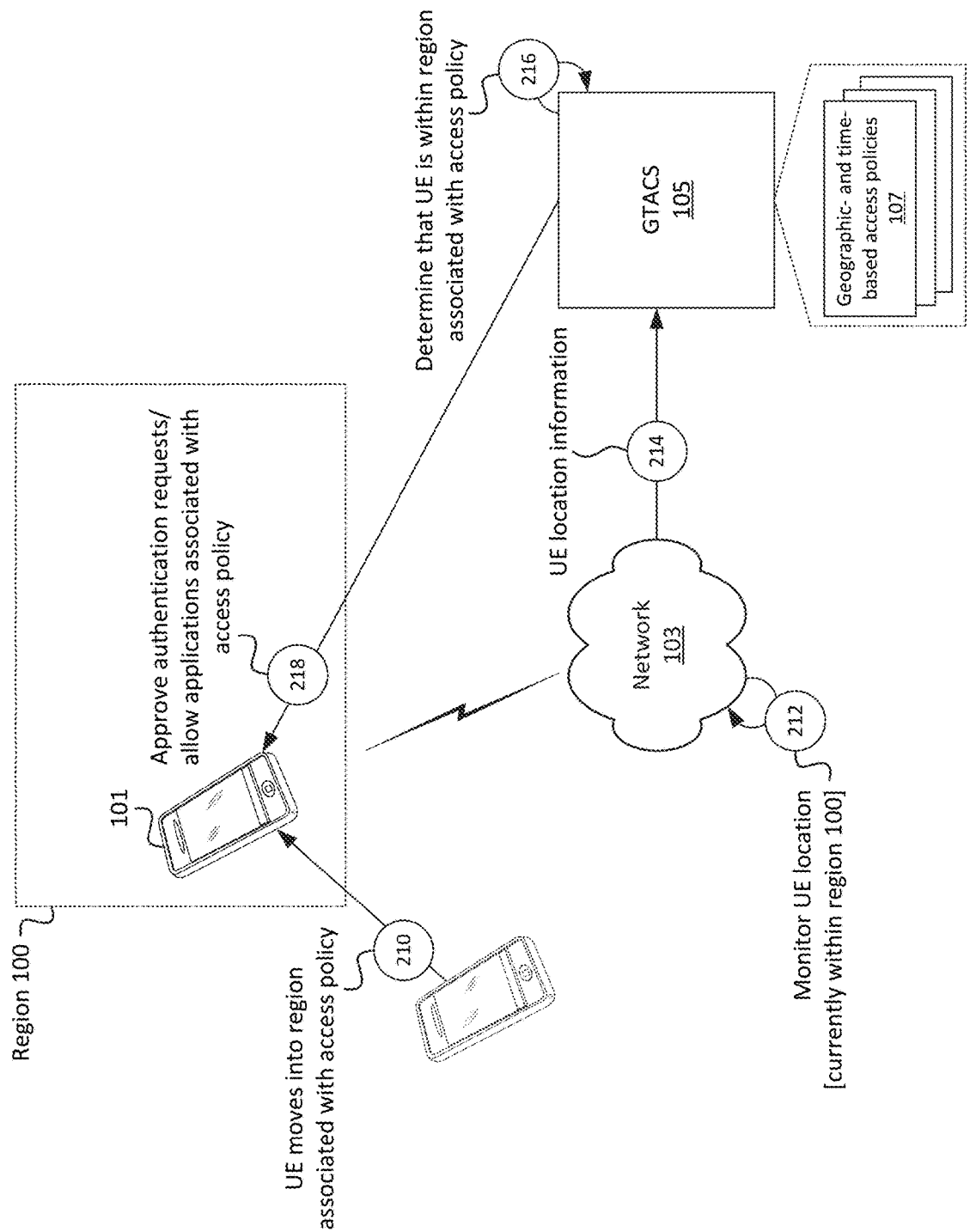
FIG. 2 illustrates an example of granting access to a UE based on the UE's presence within a particular geographical region associated with one or more access policies, in accordance with some embodiments.
Figure 3:
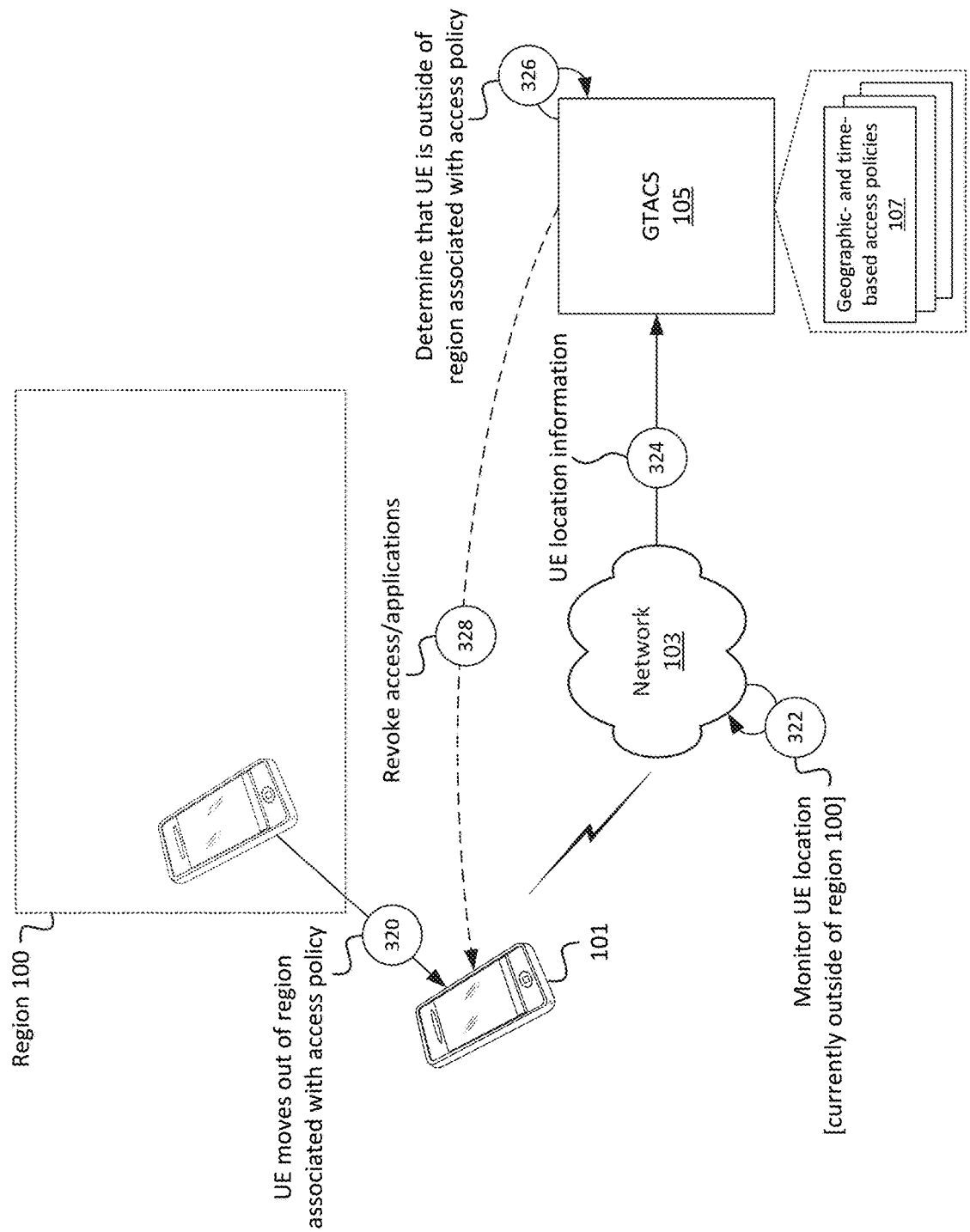
FIG. 3 illustrates an example of revoking previously granted access from a UE based on the UE leaving a particular geographical region associated with one or more access policies, in accordance with some embodiments.

FIGS. 1-3 illustrate an example environment using a location-based access control implementation. As shown in FIG. 1, for example, region 100 may be a geographical region specified in one or more access policies for UE 101, where attempts to access one or more applications, services, devices, networks, or the like (generally "systems"), may be permitted for UE 101 when UE 101 is located inside region 100. UE 101 may be communicatively coupled to network 103, which may include a RAN of a wireless network. As noted above, network 103 may include and/or may be communicatively coupled to one or more location determination facilities comprising devices or systems such as mobility devices or systems, or the like, such as an MME or an AMF. As also noted above, such devices or systems of network 103 may monitor (at 102) a geographical location of UE 101, which may include a periodic, continuous, intermittent, event-based, and/or other type of monitoring of the geographical location of UE 101. The location may be monitored and represented as latitude and longitude coordinates, location codes, street addresses, and/or other suitable representations of geographical location. In some embodiments, the location of UE 101 may be represented as a point in two-dimensional and/or three-dimensional space (e.g., including a height or altitude component), or as a two-dimensional or three-dimensional shape (e.g., polygon, radius about a point, etc.). For example, the shape may represent a margin of error of the determination of UE 101 (e.g., a two-meter radius about a point may be used when a margin of error of the location of UE 101 is about two meters).

The location of UE 101 may be provided (at 104) to Geographic- and/or Time-based Access Control System ("GTACS") 105. For example, GTACS 105 may be communicatively coupled to one or more devices or systems of network 103, such that GTACS 105 may receive the geographical location information associated with UE 101. For example, GTACS 105 may be communicatively coupled to a Service Capability Exposure Function ("SCEF"), a Network Exposure Function ("NEF"), and/or some other device or system that provides an API or other interface via which GTACS 105 may receive the location information from a location determination facility. In some embodiments, GTACS 105 may receive (at 104) the location information associated with UE 101 on an ongoing basis, such as a periodic or intermittent basis. In some embodiments, GTACS 105 may receive the location information associated with UE 101 on an event-based basis, such as when network 103 detects a change in the location of UE 101 (e.g., if UE 101 moves from one location to another), when network 103 detects a change in a connection status of UE 101 (e.g., when UE 101 transitions from an idle mode to an active mode or vice versa, when UE 101 connects to network 103, or the like), and/or in response to other events. In some embodiments, network 103 may "push" the UE location information to GTACS 105 (e.g., may provide the location information to GTACS 105 without a specific request from GTACS 105, or as part of a "subscribe"/"push" messaging arrangement), and/or may provide the UE location information in response to specific requests from GTACS 105. In some implementations, GTACS 105 may also receive UE location information from UE 101 (e.g., as may be determined by a location determination facility local to UE 101, such as a GPS unit).

GTACS 105 may maintain a set of access policies 107 (referred to herein in plural as "policies 107" or singularly as "policy 107") that specify location-based restrictions on how UE 101 is able to interact with certain applications, services, devices, networks, etc. For example, a policy 107 may specify that certain applications, services or devices are blocked (e.g. not visible, not discoverable, not launchable, etc.) when UE 101 is outside of region 100, and/or that such applications, services or devices are not blocked when UE 101 is within region 100. As a further example, a particular policy 107 may specify that authentication requests associated with UE 101 for certain applications, services or devices should be denied when UE 101 is outside of region 100, and/or that authentication requests associated with UE 101 should be granted when UE 101 is within region 100 (and/or that such authentication requests should not be denied on the basis of location, but may be denied based on other factors such as an incorrect user name or password). As an additional example, a policy 107 may specify that the performance of an application, service or device may be degraded in some form (e.g., certain features disabled, certain devices unreachable, etc.) when UE 101 is outside of region 100, and/or that such applications, services or devices are not degraded when UE 101 is within region 100.

In some embodiments, policies 107 may be associated with particular UEs 101, groups of UEs 101, users, or groups of users. In some embodiments, UE 101 may be in a group of UEs, and policy 107 may indicate conditions (e.g., location-based conditions and/or other conditions) based on which UEs that are associated with the group should be permitted to access the applications, services, devices or networks specified by the policy 107. Such groups, for example, may be associated with departments of a company, users with particular roles (e.g., technicians, admins, support, etc.), types of UEs (e.g., mobile telephones, tablets, laptops, wearable devices, etc.), or the like.

In some embodiments, policies 107 may be associated with particular services, applications, devices, networks, etc. For example, a first policy 107 may require that UE 101 be present within region 100 for access to a first set of services or applications (e.g., a service that provides status updates or performance metrics regarding a particular device or system, an application via which UE 101 may modify a configuration of a particular device or system, etc.), while a second policy may require that UE 101 be present within a different region for access to a different second set of services or applications. Accordingly, multiple policies may be applicable to a single UE 101.

In some embodiments, region 100 may be specified (e.g., by one or more policies 107) as an absolute geographical region. For example, policy 107 may specify region 100 as a set of latitude and longitude coordinates that define one or more bounds, edges, sides, etc. of region 100. In some embodiments, policy 107 may specify region 100 as a relative region, relative to the position or location of one or more reference points. As one example, a reference point may be defined as the geographical location of a device, system, landmark, a centroid, etc. other than UE 101. For example, a particular policy 107 may specify a reference point as a mobile server rack, a mobile repair platform (e.g., which may be used by technicians to maintain or repair network equipment), or the like, which may be transported between different facilities. Such mobile equipment may, in some embodiments, include location determination hardware and/or GTACS 105 may otherwise receive location information for such mobile equipment, based on which GTACS 105 may determine whether UE 101 is within a particular proximity of such mobile equipment. In the context of this example, region 100 may refer to an absolute geographical region, or a geographical region that is determined relative to a reference point such as mobile equipment.

In FIG. 1, GTACS 105 may determine (at 106) that UE 101 is outside of region 100 specified by one or more policies 107. Based on determining that UE 101 is outside of region 100, GTACS 105 may provide (at 108) restriction information that indicates that UE 101 should be restricted from accessing applications, services, devices, etc., that are specified in policy 107. In some embodiments, the restriction applied may be specified as part of policy 107—such as blocking access, degrading access, preventing authorization, etc.

Application of the restriction may vary according to implementation. As an example, a UE 101 may attempt to use a system (e.g., an application, a service, a device) that requires authentication. When the UE 101 provides credentials to the system, the system may make a request to GTACS 105 (e.g., via an API or other suitable communication pathway) to determine whether the UE 101 may access the system. GTACS 105 may respond with restriction information 108 indicating that the UE 101 is restricted access to the system. Additionally, or alternatively, UE 101 may communicate directly with GTACS 105 (e.g., on request, periodically, intermittently, and/or on some other basis) to determine whether UE 101 is authorized to access the system. In situations where UE 101 is determined by GTACS 105 to be authorized to access the desired system, GTACS 105 may return restriction information to UE 101 (e.g., including a "token" or other credential) that UE 101 may present to such system indicating its authorization for use. If, on the other hand, UE 101 is not authorized to access such applications, services, etc., GTACS 105 may return restriction information to UE 101 including an indicator that it is not authorized to access such application, services, etc. In some implementations, UE 101 may present an indication that such systems are not available for use to a user of UE 101 via a user interface.

In some embodiments, GTACS 105 may provide restriction information to applications, services, devices, etc., that are specified in policies 107, such that access attempts by UE 101 may be blocked or degraded. For example, a system (e.g., an application, service, device, network, etc) may receive a request to use the system from UE 101. The request may be an initial request (e.g., to start, launch, connect, etc.) or part of an existing series of interactions with the system. Upon receipt of restriction information 108 indicating that access by UE 101 should be restricted, the system may block or degrade access to the system by the UE 101—for example, by preventing/terminating execution of an application, service or portion of either, by preventing/terminating interaction with a device or a portion of a device, etc. Such blocking or degrading may include providing a notification to a user of UE 101 via a user interface indicating that such blocking or degrading is taking place.

In some embodiments, GTACS 105 may provide restriction information to an application, service, device or network to block access by UE 101 by making restricted applications, services, devices or networks undiscoverable. For example, where an application or service is present on a system remote from UE 101, the restriction information provided by GTACS 105 may prevent UE 101 from "seeing" (e.g., removing from a UI display, not including in search results, etc.) the restricted system.

In some implementations, UE 101 may include a facility to manage restrictions applicable to applications, services, devices, networks, etc., local to UE 101. For example, UE 101 may provide a service that communicates with GTACS 105 to receive restriction information 108 and cause UE 101 to enforce restrictions (e.g., hide, block, degrade, prevent authorization, etc.) local to UE 101.

In some embodiments, GTACS 105 may provide the restriction information 108 to one or more other devices or systems. For example, GTACS 105 may provide the restriction information 108 to one or more devices or systems specified by policy 107, one or more devices or systems that are located within region 100, one or more devices or systems that are located within a threshold proximity of UE 101. For example, an access control system local to region 100 may be used to manage access to systems local to region 100, and providing the restriction information 108 to such access control system allows the access control system to manage access requests to applications, services, devices or networks for which the access control system has responsibility.

Continuing with the example above, as shown in FIG. 2, UE 101 may move (at 210) into region 100. For example, UE 101 may physically move to region 100, and/or region 100 may move such that UE 101 becomes located within region 100 (e.g., as discussed above with respect to the example of mobile equipment based on which region 100 is defined). Network 103 may continue to monitor (at 212) the location of UE 101, and may provide (at 214) UE location information (e.g., indicating that UE 101 is located within region 100) to GTACS 105. Based on the received location information, GTACS 105 may determine (at 216) that UE 101 is located within region 100 as specified by policy 107, and may provide restriction information that indicates UE 101 is allowed access to those applications, services, devices, etc., specified by policy 107 (at 218) while UE 101 is located within region 100. How the restriction information is provided may depend on the implementation used, as noted above. For example, where restriction is implemented through authentication requests, the restriction information may be provided in response to an authentication process. Where restriction is implemented through initial/continuing access, the restriction may be provided to the system to allow the system to be executed by the UE 101.

Such applications, services, etc., may remain available while UE 101 remains within region 100, and may become unavailable once UE 101 leaves region 100. Continuing the example above, as shown in FIG. 3, UE 101 may exit (at 320) geographical region 100. For example, UE 101 may be physically moved, and/or a reference point (e.g., a location of mobile equipment or some other device or system) associated with region 100 may move such that UE 101 is no longer located within region 100. Network 103 may continue to monitor (at 322) the location of UE 101, and provide (at 324) location information associated with UE 101 to GTACS 105. Based on the received location information, GTACS 105 may determine (at 326) that UE 101 is outside of region 100 specified by policy 107, and may revoke the previously granted access, for example, by providing restriction information that indicates the UE 101 is no longer allowed to access applications and/or services associated with policy 107. How the restriction information is provided may depend on the implementation used, as noted above. For example, where restriction is through authentication requests, the restriction information may be provided in response to an authentication process. Where restriction is through initial/continuing access, the restriction may be provided to the system to terminate/degrade any current access to the system and/or to block/degrade future access by the UE 101. Based on the revocation, in some implementations, UE 101 may indicate to a user via a user interface that UE 101 is no longer permitted access.

Figure 4:
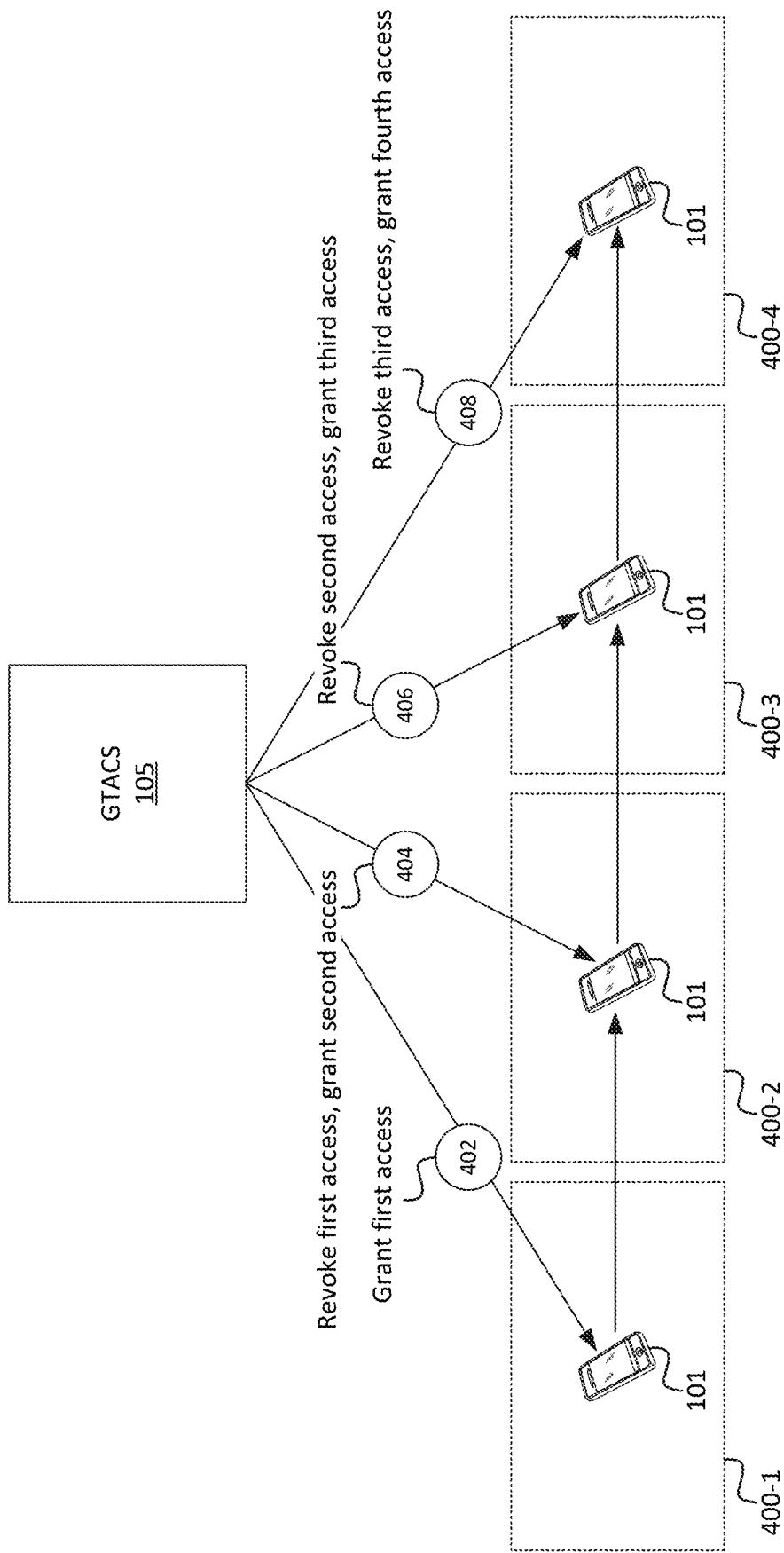
FIG. 4 illustrates an example of different levels of access being granted to a UE based on the UE's presence within different geographical regions associated with different access policies, in accordance with some embodiments.

As noted above, different policies 107 may be associated with different geographical regions. For example, as shown in FIG. 4, UE 101 may be located within geographical region 400-1 at a first time. While not necessarily explicitly shown in this figure or subsequent figures, GTACS 105 may continue to receive location information regarding UE 101 from network 103 and/or some other suitable device or system. Based on the presence of UE 101 within geographical region 400-1, GTACS 105 may provide indication (at 402) of allowance of first access to UE 101. For example, GTACS 105 may determine that geographical region 400-1 is associated with a first policy 107, with a first set of access parameters. Access parameters may refer to, for example, a set of permissions, applications, or the like that may be accessible to UE 101 when UE 101 is located within a particular region associated with a particular policy 107 (e.g., geographical region 400-1, associated with a first set of access parameters in this example). As noted above, such access parameters may include indicating to UE 101 or some other device or system that UE 101 is located within a particular region associated with a particular policy 107, based on which UE 101 may be permitted to access one or more applications or services (either local to UE 101 or through connection to another device or system that provides such applications or services).

As further shown, UE 101 may move from geographical region 400-1 to geographical region 400-2. Based on the movement of UE 101 from geographical region 400-1 to geographical region 400-2, GTACS 105 may provide indication (at 404) of a revocation of the allowance of first access, and may provide indication of allowance of second access. For example, GTACS 105 may indicate to UE 101 and/or some other device or system that applications, services, and/or other access granted to UE 101 when UE 101 is located within geographical region 400-1 are no longer authorized for access by UE 101. In this example, geographical region 400-2 may be associated with a different second set of access parameters, such as a different set of applications, services, information, etc. associated with geographical region 400-2 (e.g., as specified by one or more policies 107).

Similarly, UE 101 may move from geographical region 400-2 to geographical region 400-3, based on which GTACS 105 may provide indication (at 406) of a revocation of the allowance of second access (e.g., as granted when UE 101 entered and/or remained within geographical region 400-2) and may provide indication of allowance of third access associated with geographical region 400-3 (e.g., based on one or more policies 107 specifying third access parameters associated with geographical region 400-3). As further shown, UE 101 may move from geographical region 400-3 to geographical region 400-4, based on which GTACS 105 may provide indication (at 408) of a revocation of the allowance of the third access (e.g., as granted when UE 101 entered and/or remained within geographical region 400-3) and may provide indication of allowance of fourth access associated with geographical region 400-4 (e.g., based on one or more policies 107 specifying fourth access parameters associated with geographical region 400-4). As similarly noted above, granting access "to" UE 101 may include indicating such access to one or more devices or systems which may be communicatively coupled to UE 101 (e.g., which may provide services, data, etc. to UE 101).

As also noted above, the same policy 107 may apply to certain UEs or users, or groups of UEs or users. For example, a particular policy 107 may include identifiers of one or more UEs, such as International Mobile Subscriber Identity ("IMSI") values, International Mobile Station Equipment Identity ("IMEI") values, Globally Unique Temporary Identifier ("GUTI") values, Subscription Permanent Identifier ("SUPI") vales, Mobile Directory Number ("MDN") values, Internet Protocol ("IP") addresses, and/or other suitable identifiers. In some embodiments, UE identifiers may be provided in connection with location information, in order to associate a UE included in a policy specification with such location information. In some embodiments, a particular policy may include identifiers of particular users, such as user identifiers, user names, and/or other suitable identifiers. Such user identifiers may be used in situations where a given user may use different UEs to attempt to gain access to one or more services, applications, etc. In such embodiments, GTACS 105 may receive such identifiers in conjunction with access requests associated with a given UE 101, such that GTACS 105 may determine that a given access request, associated with a particular UE 101, is also associated with a particular user identifier.

Figure 5:
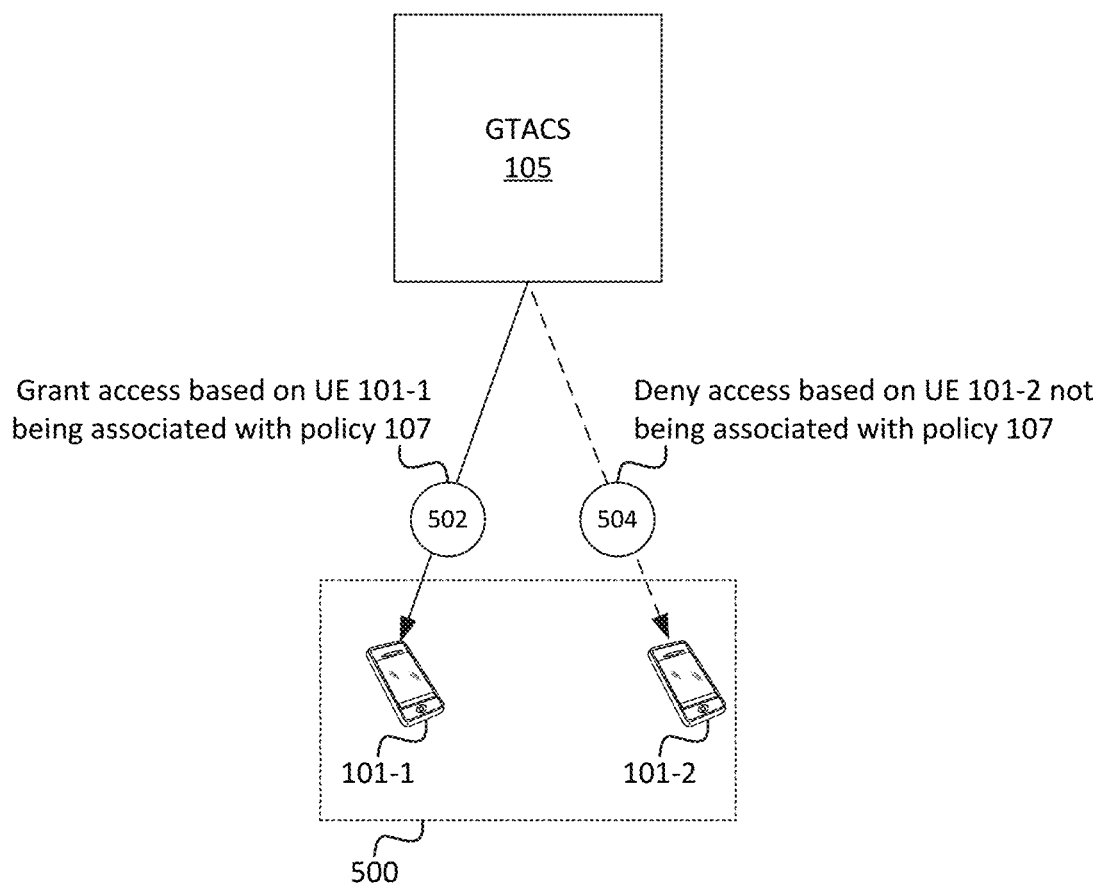
FIG. 5 illustrates an example of different UEs being selectively granted or denied access while located within a particular region associated with a particular access policy, in accordance with some embodiments.

For example, as shown in FIG. 5, two example UEs (i.e., UE 101-1 and UE 101-2) may be located within region 500. Region 500 and UE 101-1 may be associated with a particular policy 107, based on which GTACS 105 may provide indication (at 502) that UE 101-1 may access one or more applications, services, or the like specified by policy 107. For example, GTACS 105 may receive a UE or user identifier associated with UE 101-1 along with location information associated with UE 101-1, based on which GTACS 105 may determine that UE 101-1 is presently located within a geographical region specified by policy 107, and may further determine that UE 101-1 is authorized to access the one or more applications, services, etc., specified in policy 107 when located within geographical region 500. On the other hand, GTACS 105 may provide indication (at 504) that UE 101-2 has restricted access to such applications, services, etc., based on UE 101-2 not being identified as an authorized UE by policy 107, even though UE 101-2 is reported as located within region 500 specified by policy 107.

Figure 6:
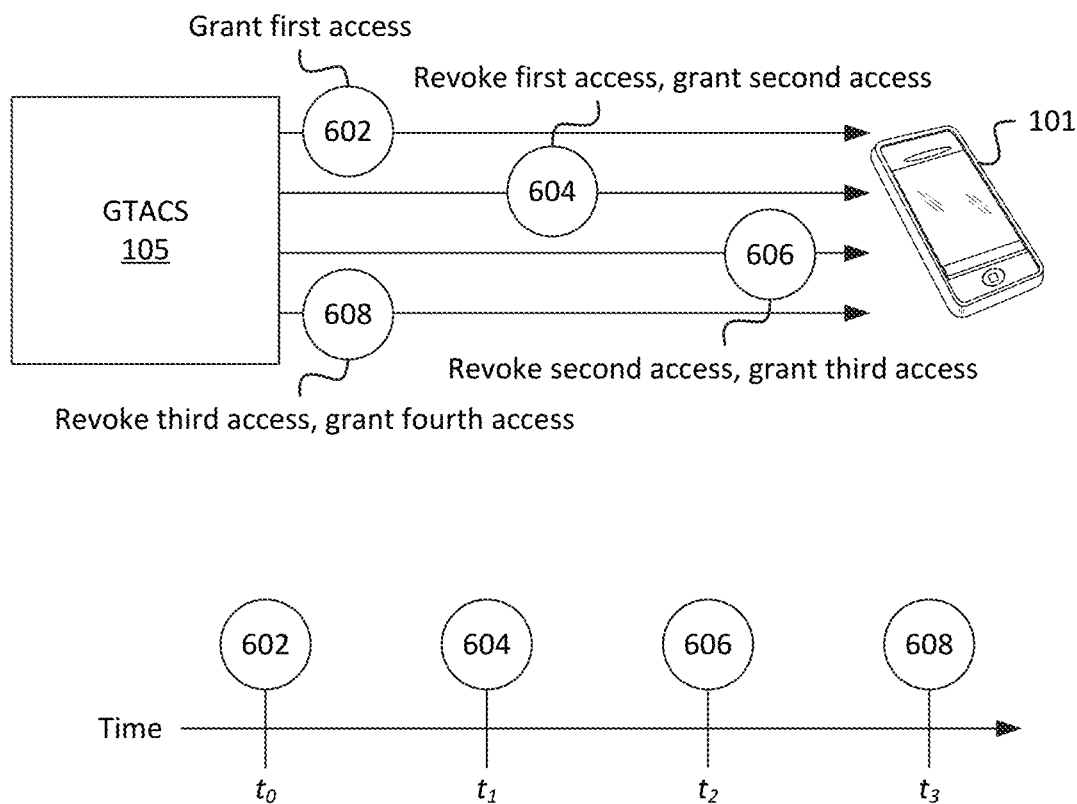
FIG. 6 illustrates an example of different levels of access being granted to a UE at different times associated with different access policies, in accordance with some embodiments.

In some embodiments, as noted above, GTACS 105 may allow or restrict access to one or more applications, services, etc. based on time-based criteria. FIG. 6 illustrates an example or a time-based restriction. For example, assume that UE 101, shown in FIG. 6, remains stationary. In this example, GTACS 105 may maintain a set of policies 107, which include time-based criteria (e.g., in addition to location-based criteria). For example, a first policy 107 may be associated with a first set of access parameters during a first time period (e.g., between times $t_0$ and $t_1$), a second policy 107 may be associated with a second set of access parameters during a second time period (e.g., between times $t_1$ and $t_2$), a third policy 107 may be associated with a third set of access parameters during a third time period (e.g., between times $t_2$ and $t_3$), and a fourth policy 107 may be associated with a fourth set of access parameters during a third time period (e.g., starting at time $t_3$). A particular policy 107 may specify a time period in various ways, such as a start time, an end time, a duration, etc.

As shown, at time $t_0$, GTACS 105 may grant (at 602) first access to UE 101, based on the time-based criteria associated with the first policy 107. At time $t_1$, GTACS 105 may revoke (at 604) the first access due to first policy 107 and grant second access to UE 101 due to second policy 107. As further shown in FIG. 6, GTACS 105 may revoke (at 606) the second set of access parameters at time $t_2$ based on the second policy 107, and may grant a third set of access parameters at time $t_2$ based on the third policy 107. Similarly, GTACS 105 may revoke (at 608) the third access parameters at time $t_3$ based on the third policy 107 and grant fourth access parameters at time $t_4$ based on the fourth policy 107. As discussed above, different access parameters may be associated with different applications or functions at UE 101, different services or data that may be provided to UE 101 (e.g., by an application server or some other device or system), or the like. As also discussed above, granting or revoking access may include one or more indications provided by GTACS 105 to UE 101 and/or to one or more other devices or systems that are communicatively coupled with UE 101. Based on such indications, UE 101 may enable or disable, activate or deactivate, etc. applications, services, devices, or the like.

Figure 7A:
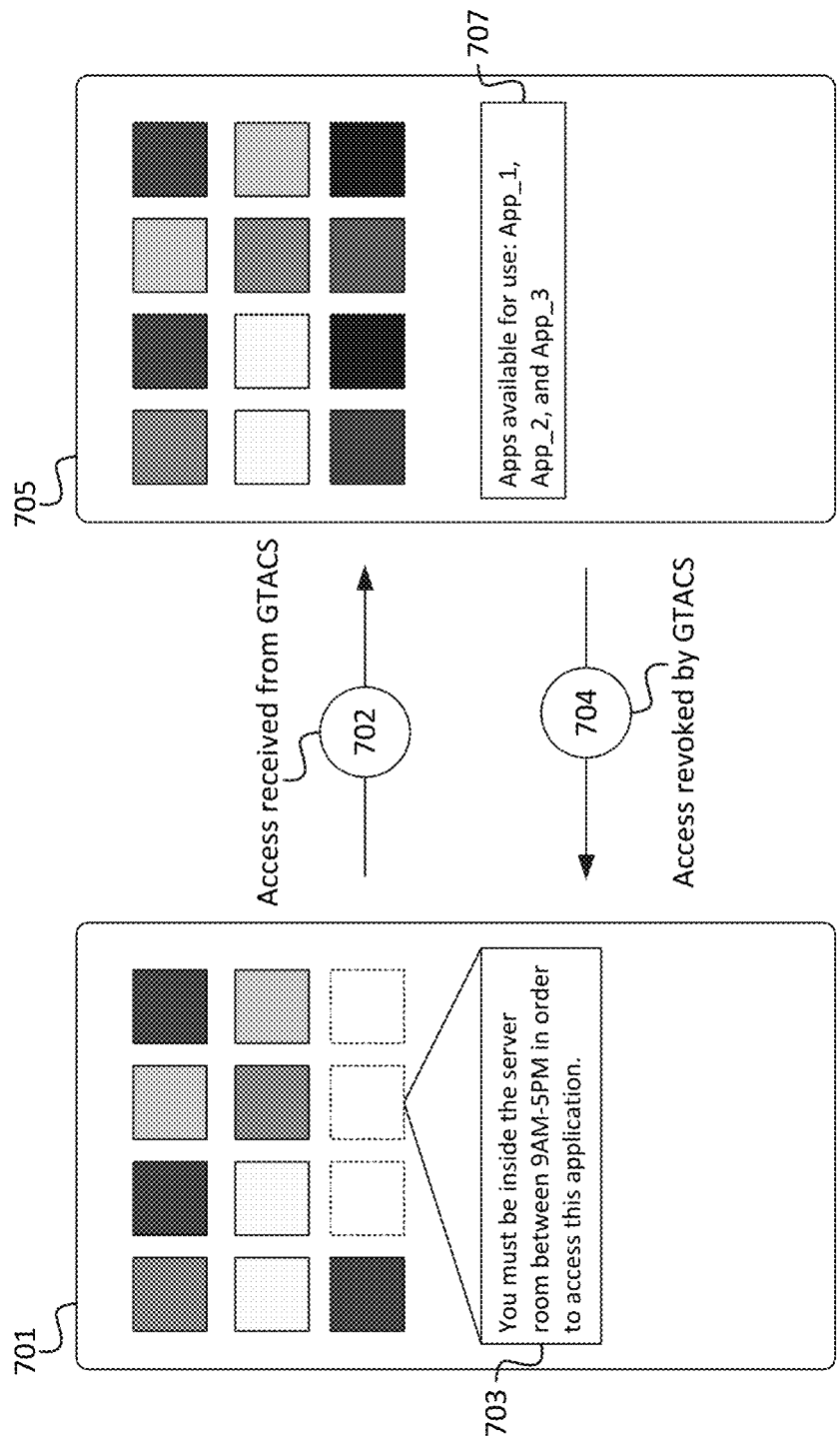
FIG. 7A illustrates example graphical user interfaces ("GUIs"), which may correspond to the granting or denying of access to a UE, in accordance with some embodiments.

FIG. 7A illustrates an example of enabling and/or disabling access to applications and/or other functionality at UE 101 based on access being allows or restricted by GTACS 105. As shown, for example, GUI 701 may be displayed by UE 101. GUI 701 may be associated with a "home" screen, an "apps" screen, an "apps" folder, and/or other representation of applications or functions that may be accessed via UE 101. In this example, applications that may be selected, opened, accessed, etc. are represented by shaded square icons. For example, a user may actuate or select a particular icon via a haptic selection, a voice command selection, and/or some other type of selection, and the selection of the particular icon may cause UE 101 to execute, run, etc. an application or function associated with the particular icon.

GUI 701 may further include a set of icons that are represented in a manner that indicates that applications associated with the icons are unavailable and/or are available with limited functionality. In this example, such manner of representation may include a dashed line around the icons, a modified shading of the icons, a replacement of color icons with greyscale or black and white icons, a replacement of an application icon with a "download" or "redownload" icon (e.g., a cloud with a downward facing arrow), and/or some other type of representation. In some embodiments, other types of representation of unavailable or limited functionality may be provided via UE 701, such as an "X" or other overlay over respective icons, notification 703, and/or other representations. Notification 703 may be displayed, for example, when a user selects an icon associated with an application that is presently unavailable due to one or more policies 107. For example, notification 703 may include a "pop-up" notification, dialog box, or other type of visual indicator. In some embodiments, some other type of indicator may be provided, such as an audible indicator, a blinking light, or the like. In some embodiments, notification 703 may include information associated with one or more criteria associated with policy 107, such as an indication of a time and/or location associated with policy 107. In the example of FIG. 7A, notification 703 indicates that the policy is associated with a particular location ("server room") and time ("9 AM-5 PM"). In practice, notification 703 may provide less information, additional information, and/or different information associated with policy 107.

As further shown, UE 101 may receive (at 702) restriction information from GTACS 105 indicating access is now allowed, where the access includes an activation, enabling, etc. of the applications that were indicated by GUI 701 as being disabled. GUI 705 may include an unmodified version of the icons that were modified in GUI 701, such as a removal of the dashed lines, a restoration of original color or shading of the icons, removal of one or more notifications (e.g., notification 703), or the like. In some embodiments, GUI 705 may include notification 707, which may indicate that applications that were previously unavailable are now available (e.g., based on the access received (at 702) from GTACS 105). In some embodiments, UE 101 may implement an API, application, sandbox, launcher, or the like, which communicates with GTACS 105 to receive restriction information that includes indications of whether access to particular applications has been granted or revoked, and which may further communicate with an operating system, kernel, etc. of UE 101 in order to make such applications available or unavailable. As further shown, when access to the applications is revoked (at 704) by GTACS 105 providing restriction information indicating an access restriction by UE 101, UE 101 may present GUI 701, which includes the modified icons associated with the unavailable applications. In some embodiments, revocation of access may cause UE 101 to delete application data associated with the applications from a local memory, cache, etc. of UE 101.

Figure 7B:
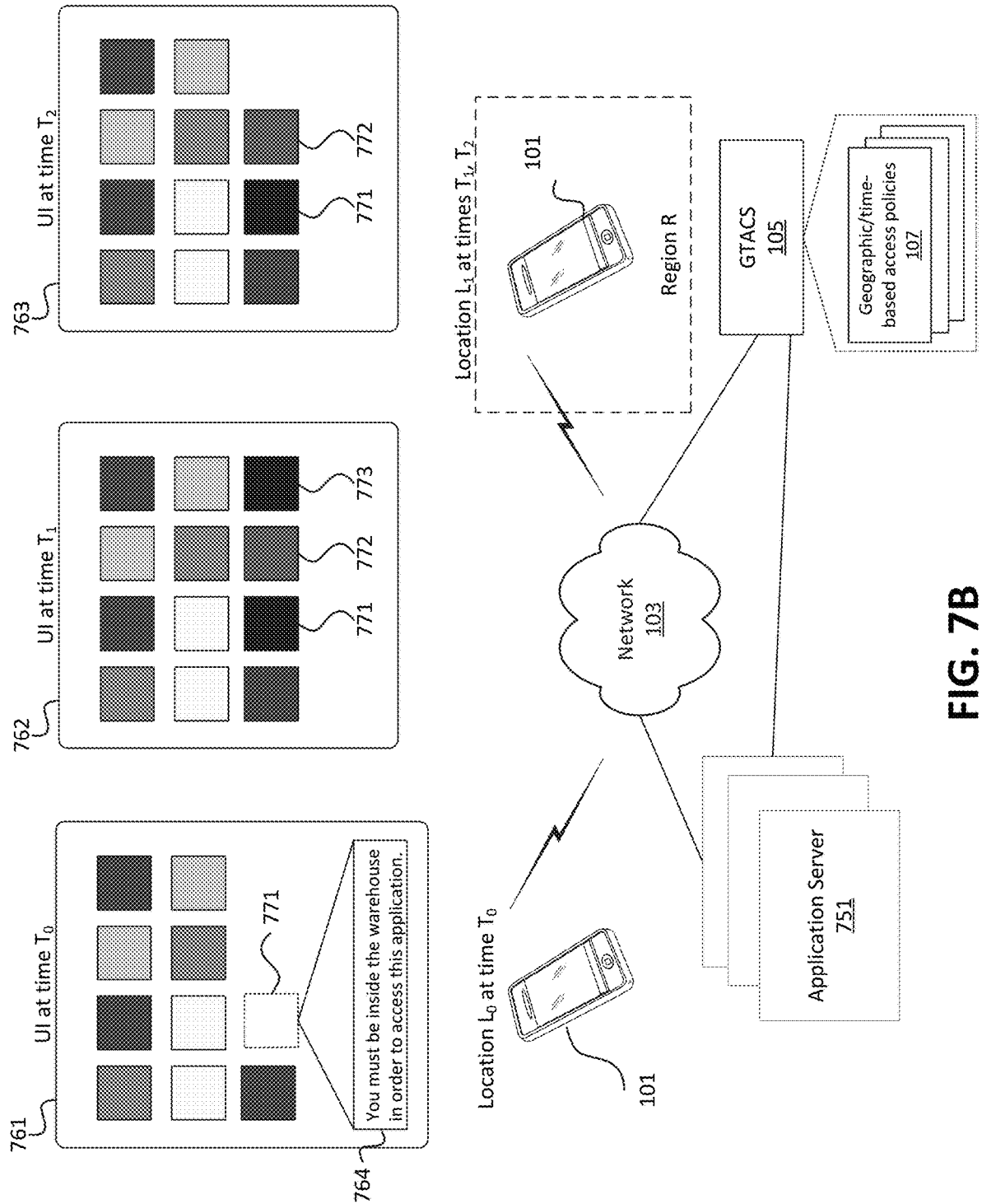
FIG. 7B shows another example of enabling and/or disabling access to applications and/or other functionality at a UE based on access being restricted by a GTACS in accordance with some embodiments.

FIG. 7B shows another example of enabling and/or disabling access to applications and/or other functionality at UE 101 based on access being restricted by GTACS 105. As shown in FIG. 7B, UE 101 may interact with application server 751 over network 103 to obtain access to a set of applications available at application server 751. UE 101 may implement a facility local to UE 101 that acts as a "thin" client—the facility may receive user input (e.g., haptic input, voice input, and/or other types of input), forward the input to application server 751 via network 103, receive presentation information (e.g., graphical information, audio information, and/or other information) from application server 751 over network 103, and present the information on a user interface of UE 101. In some embodiments, such "thin" client applications may implement one or more APIs or other communication pathways via which the applications may communicate with one or more application servers 751, etc. In some embodiments, selection or initialization of the facility at UE 101 may cause the facility to communicate with associated application servers 751 to obtain presentation information for those applications that are available at application servers 751. When a user provides an indication that an available application should be launched, that indication may be provided to application server 751 that has made the application available, such that the application server 751 may instantiate a server-side application instance to communicate with the facility executing at UE 101.

In some embodiments, one or more application servers 751 may be part of a MEC facility that provides low latency communications with UE 101, such that the interactions between UE 101 and application server 751 are perceived by users of UE 101 as being as if the application being executed is local to UE 101. In some implementations, a single "front end" application server 751 may be responsible for interactions with a UE 101 through a service that communicates with the facility at UE 101 providing the "thin" client, and such front end application server 751 may interact with other application servers 751 to provide individual applications available for use by UE 101 (and presented in the user interface of UE 101).

As similarly noted with respect to the example of FIG. 7A above, a particular application server 751 may determine whether UE 101 is authorized to access applications at application server 751 based on the geographical location of UE 101, time-based criteria, authentication factors provided by UE 101, and/or other factors. For example, the location information for UE 101 may be periodically or intermittently provided to GTACS 105 (e.g., from a location determination facility of network 103 and/or from UE 101), and GTACS 105 may apply one or more policies 107 that are applicable to UE 101 to determine restrictions associated with certain applications, services, devices, etc., that UE 101 may attempt to access. GTACS 105 may provide restriction information to application servers 751 to allow application servers 751 with applications, services, devices, etc., that are specified in policies 107 to set restrictions on such applications, services, devices, etc. One or more application servers 751 may provide APIs to request and/or receive such restriction information from GTACS 105, and such APIS may include the ability to subscribe to "push" notifications related to changes in the location of UE 101 and/or applications available on application server 751.

In the example of FIG. 7B, access to applications 771, 772 and 773 may be specified in policies 107 as being restricted from UE 101 unless UE 101 is within a region R containing location $L_1$. Further assume that policies 107 also contain a restriction that application 773 may only be accessible when UE 101 is in Region R during a time period containing a time $T_1$. Policies 107 may also specify the type of restrictions applicable to applications 771, 772 and 773. For example, at time $T_0$, application 771 may be displayed in user interface 761 of UE 101, but may not be launched by UE 101 (e.g., as denoted by the dashed line in user interface 761), while applications 772 and 773 may not be shown on a user interface of UE 101 when they are not accessible (e.g., to impose a higher level of security associated with those applications). Accordingly, when UE 101 is reported being in a location $L_0$ outside of region R at time $T_0$, application server 751 provides presentation information that causes a user interface of UE 101 to display its available applications as not including applications 771, 772 and 773. Additionally, application 771 is displayed in user interface 761 using a depiction that indicates it is unavailable (e.g., using shading, iconography, etc.). If a user were to attempt to launch application 771, a notification such as notification 764 may be provided to indicate the inaccessibility of application 771 to UE 101 and, in some implementations, the restriction being applied.

When UE 101 moves to be located at a Location $L_1$ which is inside Region R at a time $T_1$, this location change may be reported to GTACS 105, which in turn may provide restriction information to application servers 751 based on policies 107. Application server 751 serving UE 101 may provide presentation information to UE 101 that now causes user interface 762 of UE 101 to display the availability of applications 771, 772, and 773. A user of UE 101 may now provide user input to cause any of applications 771, 772, and 773 to launch and execute (which may require further authorization steps such as identity authentication, role-based authorization, and the like).

While UE 101 remains in Location $L_1$, but as time passes to a time $T_2$ which is outside of the time period when application 773 is available to UE 101, GTACS 105 may provide restriction information to application servers 751 based on policies 107. Application server 751 serving UE 101 may provide presentation information to UE 101 that now causes user interface 763 of UE 101 to display the availability of applications 771 and 772, but not application 773.

In some embodiments, allowing or restricting access (such as described in the examples above) may include allowing or restricting access to one or more networks, such as one or more RANs, core networks, or portions thereof. For example, GTACS 105 may determine that a particular policy 107 is associated with access to a particular "slice" of a 5G network, where a slice corresponds to a "network slice" as implemented according to Third Generation Partnership Project (3GPP) specifications, and includes instances of one or more network functions. The different slices may provide differentiated levels of service, such as service in accordance with different Quality of Service ("QoS") parameters. The different slices may additionally or alternatively provide service to different applications or application types. In such situations, GTACS 105 may provide indications to a network element managing network access control and/or slice access control (e.g., a base station to which UE 101 is communicatively coupled, an AMF, a Session Management Function ("SMF"), a Unified Data Management function ("UDM"), a Network Slice Selection Function ("NSSF") or some other element), which may allow or block UE 101 to connect to a particular slice of the core network.

Figure 8:
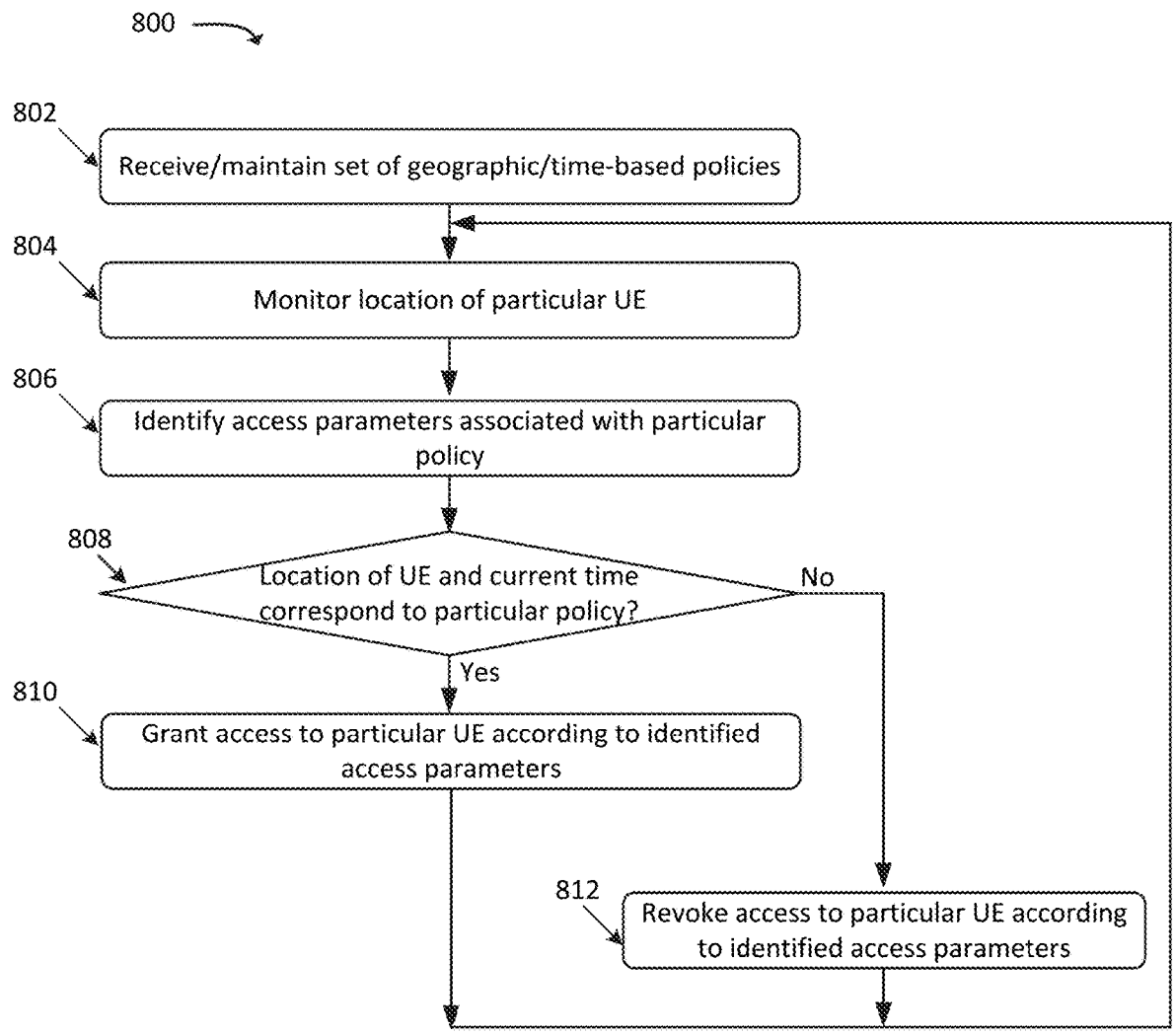
FIG. 8 illustrates an example process for granting and/or revoking access to one or more applications, functions, etc. to a UE based on geographical location-based and/or time-based policies, in accordance with some embodiments.

FIG. 8 illustrates an example process 800 for granting and/or revoking access to one or more applications, services, devices, etc. to UE 101 based on geographical location-based and/or time-based policies. In some embodiments, some or all of process 800 may be performed by GTACS 105. In some embodiments, one or more other devices may perform some or all of process 800 (e.g., in concert with, and/or in lieu of, GTACS 105).

As shown, process 800 may include receiving and/or maintaining (at 802) a set of geographical location-based and/or time-based policies. For example, as discussed above, GTACS 105 may receive and/or maintain a set of policies 107, which may be associated with particular UEs or groups of UEs. Policies 107 may specify applications, services, devices, etc. that UE 101 may attempt to access when located within a particular geographical region. In some embodiments, as discussed above, policies 107 may specify time-based criteria, such that the location-based criteria may further be constrained by the time-based criteria.

Process 800 may further include monitoring (at 804) location information of a particular UE 101. For example, GTACS 105 may monitor the location information of UE 101, as well as one or more other UEs, based on location information determined and provided by a network-based location determining facility (such as base station to which UE 101 is connected, a mobility element to which such base station is communicatively coupled (e.g., a MME, an AMF, or the like)), and/or some other suitable device or system that determines the location of UE 101. In some embodiments, the location information may be provided by the UE 101 itself from its local location determination facility, however the location information may also be determined by an entity other than UE 101 itself, such that UE 101 is not able to generate or provide inaccurate or "spoofed" location information.

Process 800 may additionally include identifying (at 806) access parameters associated with a particular policy. For example, GTACS 105 may identify one or more applications that UE 101 is authorized to access when satisfying conditions or criteria associated with policy 107 (e.g., location-based and/or time-based criteria), may identify one or more networks or network slices that UE 101 is authorized to access when satisfying such conditions or criteria, may identify one or more application servers or other devices or systems that are authorized to provide data or services to UE 101 when UE 101 satisfies such conditions or criteria, etc.

Process 800 may also include determining (at 808) whether the monitored location of UE 101 and a current time correspond to a particular one of the received and/or maintained policies 107. For example, GTACS 105 may determine whether a location of UE 101 (e.g., as monitored at 804) satisfies location-based criteria associated with a particular policy 107. For example, GTACS 105 may determine whether UE 101 is located inside a region specified by policy 107. In situations where policy 107 includes time-based criteria and/or other criteria, GTACS 105 may further determine whether the other criteria is also met.

In some embodiments, GTACS 105 may determine (at 808) whether the location, time, and/or other criteria are met in an ongoing process (e.g., without a specific request or message from UE 101 or some other device or system). In some embodiments, GTACS 105 may determine (at 808) whether the location, time, and/or other criteria are met in response to a request (e.g., from UE 101, from an application server or MEC that is communicatively coupled to UE 101, or some other device or system) or in response to some other event. In some embodiments, GTACS 105 may authenticate UE 101 based on one or more factors prior to determining whether the criteria associated with policy 107 are met. For example, GTACS 105 may authenticate UE 101 based on a user name and password, based on an authentication token provided by UE 101 or some other device or system (e.g., which may be generated upon successful biometric authentication or some other type of authentication), or some other type of authentication factor.

If the criteria associated with a particular policy 107 are met (at 808—YES), process 800 may further include granting (at 810) access to UE 101 in accordance with the access parameters associated with policy 107. For example, as discussed above, GTACS 105 may provide an indication to UE 101 and/or one or more devices or systems that are communicatively coupled to UE 101 (for example, an application server, a MEC facility, etc.) that UE 101 has been granted access to one or more applications, services, devices, etc. UE 101 may accordingly provide access to a user of UE 101, for example, through a user interface that displays information on applications, services, devices, etc., that are accessible by UE 101, and/or notifications related to accessibility/inaccessibility. In some implementations, the user interface may be through a facility providing a "thin" client or other type of application, and one or more application servers may provide certain types of information or data to UE 101 reflective of applications, services, devices, etc., that are accessible (or inaccessible) by UE 101.

If, on the other hand, the criteria associated with policy 107 are not met (at 808—NO), process 800 may additionally include revoking (at 812) access to UE 101 according to the access parameters of policy 107. For example, if access had previously been granted (at 810) to UE 101, such access may be revoked. If access has not been previously granted, GTACS 105 may continue to not grant access based on the one or more criteria associated with policy 107 not being met. Revoking access may include providing restriction information to UE 101 and/or other devices/applications indicating that UE 101 has restrictions (e.g., blocked access, degraded access) to the use of certain applications specified by the policy 107.

As further shown, after granting (at 810) or revoking (at 812) access to UE 101, GTACS 105 may continue to monitor (at 804) the location of UE 101. In this manner, GTACS 105 may dynamically and in real time (or in near-real time) continue to provide access in accordance with geographical location-based and/or time-based policies 107.

While the example of FIG. 8 is provided in the context of one policy 107 and one UE 101, similar concepts may apply to multiple policies and/or multiple UEs 101. For example, GTACS 105 may evaluate criteria associated with multiple policies 107 for a given UE 101, and may grant or revoke multiple access parameters associated with multiple policies 107 for UE 101. As another example, GTACS 105 may evaluate criteria associated with one policy 107 for multiple UEs 101 (e.g., in situations where the same policy 107 is associated with multiple UEs 101, such as a defined group of UEs 101). As yet another example, GTACS 105 may evaluate criteria associated with multiple policies 107 for multiple UEs 101. In some embodiments, different policies 107 may be associated with different priority levels. Such priority levels may be a factor in which a policies 107 are applied in the situation where conflicting policies 107 apply. For example, if a given UE 101 would be granted access in a given situation (e.g., in a particular geographical location, for a particular application, etc.) under a first policy 107, but would be denied access in the same situation under a second policy in the same situation, the policy with the higher priority level may take precedence. For example, if the first policy 107 has a higher priority, then UE 101 would be granted access in this situation. If, on the other hand, the second policy 107 has a higher priority, then UE 101 would be denied access in this situation.

Figure 9:
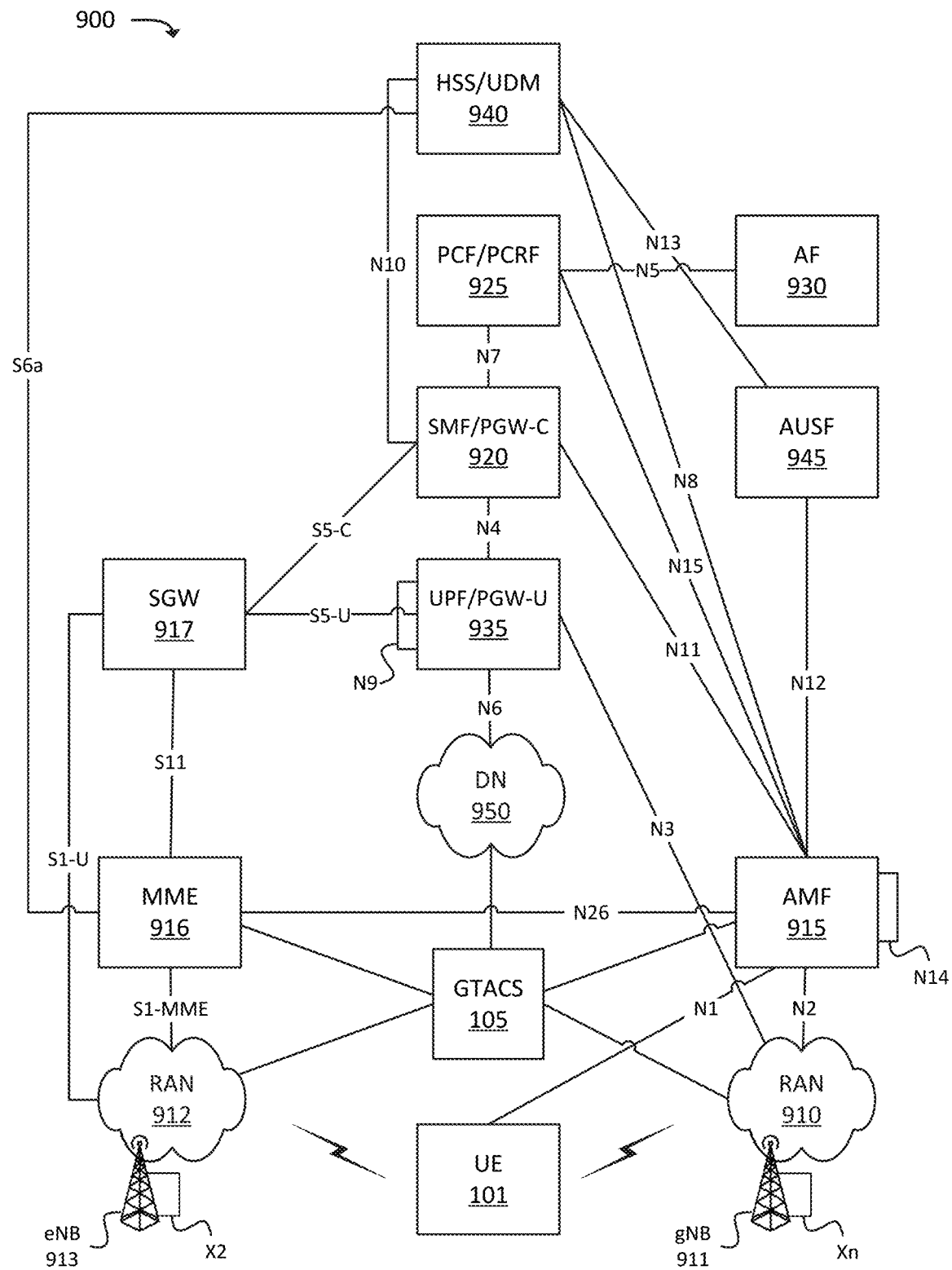
FIG. 9 illustrates an example environment in which one or more embodiments, described herein, may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC). As shown, environment 900 may include UE 101, RAN 910 (which may include one or more Next Generation Node Bs ("gNBs") 911), RAN 912 (which may include one or more one or more evolved Node Bs ("eNBs") 913), and various network functions such as AMF 915, MME 916, SGW 917, SMF/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, HSS/UDM 940, and Authentication Server Function ("AUSF") 945. Environment 900 may also include one or more networks, such as Data Network ("DN") 950. Environment 1100 may include one or more additional devices or systems communicatively coupled to one or more networks (e.g., DN 950), such as GTACS 105.

The example shown in FIG. 9 illustrates one instance of each network component or function (e.g., one instance of SMF/PGW-C 920, PCF/PCRF 925, UPF/PGW-U 935, HSS/UDM 940, and/or 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 101 may include a computation and communication device, such as a wireless mobile communication device that is capable of communicating with RAN 910, RAN 912, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 101 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 101 may communicate with one or more other elements of environment 900. UE 101 may communicate with RAN 910 via an air interface (e.g., as provided by gNB 911). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, AMF 915, and/or one or more other devices or networks) and may communicate the traffic to UE 101 via the air interface.

RAN 912 may be, or may include, a LTE RAN that includes one or more base stations (e.g., one or more eNBs 913), via which UE 101 may communicate with one or more other elements of environment 900. UE 101 may communicate with RAN 912 via an air interface (e.g., as provided by eNB 913). For instance, RAN 910 may receive traffic (e.g., voice call traffic, data traffic, messaging traffic, signaling traffic, etc.) from UE 101 via the air interface, and may communicate the traffic to UPF/PGW-U 935, and/or one or more other devices or networks. Similarly, RAN 910 may receive traffic intended for UE 101 (e.g., from UPF/PGW-U 935, SGW 917, and/or one or more other devices or networks) and may communicate the traffic to UE 101 via the air interface.

AMF 915 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 101. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 101, from DN 950, and may forward the user plane data toward UE 101 (e.g., via RAN 910, SMF/PGW-C 920, and/or one or more other devices). In some embodiments, multiple UPFs 935 may be deployed (e.g., in different geographical locations), and the delivery of content to UE 101 may be coordinated via the N9 interface (e.g., as denoted in FIG. 9 by the line marked "N9" originating and terminating at UPF/PGW-U 935). Similarly, UPF/PGW-U 935 may receive traffic from UE 101 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 101.

GTACS 105 may include one or more devices, systems, VNFs, etc., that perform one or more operations described herein. For example, GTACS 105 may receive and/or maintain one or more policies 107, monitor and/or otherwise receive location information associated with one or more UEs 101, determine (e.g., based on the monitored location) whether criteria associated with one or more policies 107 are met, and selectively grant and/or deny access by UE 101 to certain resources (e.g., applications, services, devices, etc.) based on whether such policies 107 are met. As discussed above, GTACS 105 may communicate (e.g., via DN 950) with one or more application servers, in order to indicate access parameters associated with one or more UEs 101 (e.g., based on policies 107). In some embodiments, GTACS 105 may communicate with RAN 910 and/or RAN 912 (e.g., gNB 911, eNB 913, and/or one or more other devices or systems), AMF 915, MME 916, and/or one or more other devices or systems to indicate access parameters associated with one or more UEs 101. As discussed above, UE 101 may be permitted to access (or denied access to) RAN 910, RAN 912, and/or one or more network slices based on the access parameters.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 101 may communicate.

Figure 10:
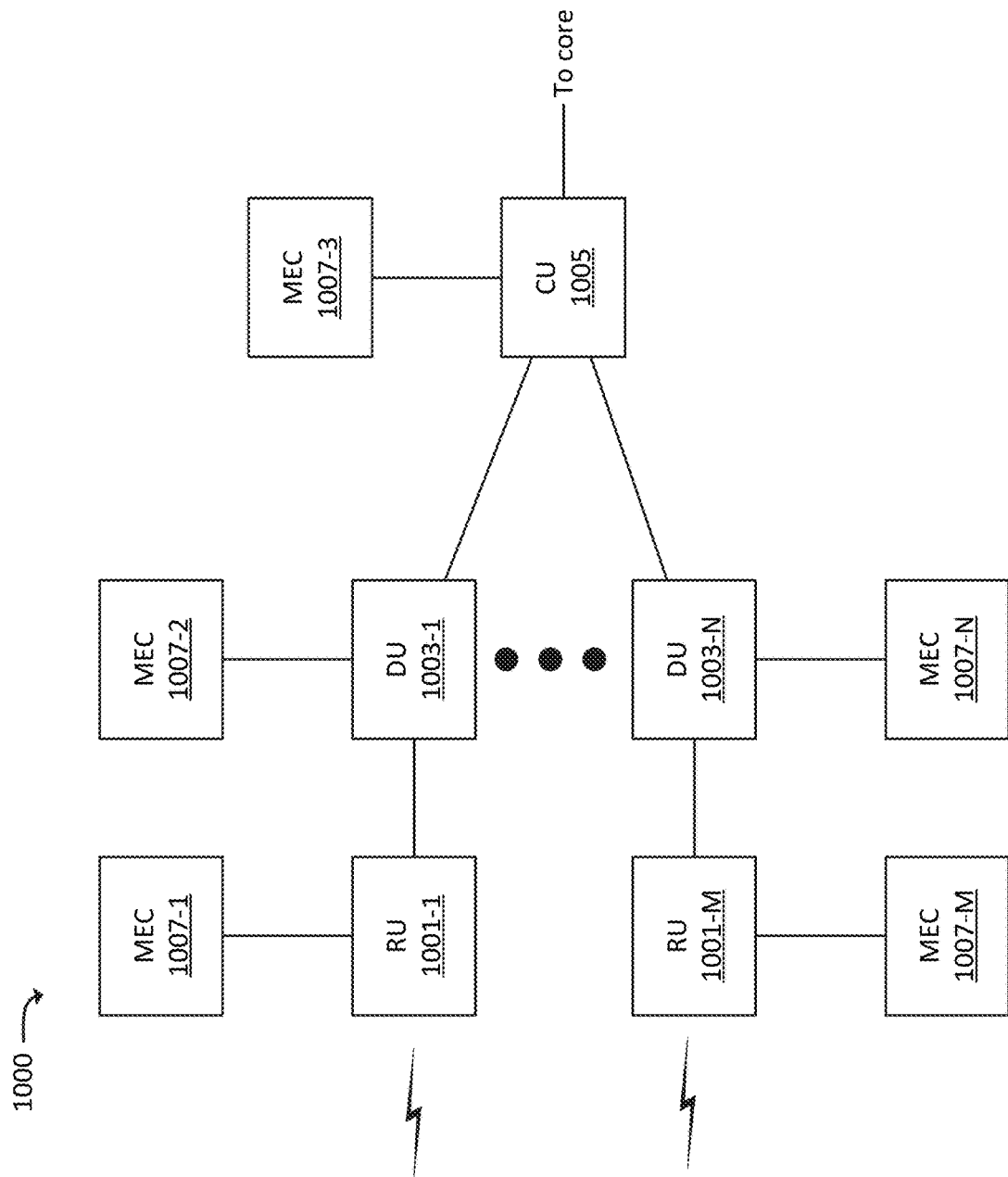
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 101 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 101, and may determine which DU(s) 1003 should receive the downlink traffic. DU 1003 may include one or more devices that transmit traffic between a core network (e.g., via CU 1005) and UE 101 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 101.

RU 1001 may include hardware circuitry (e.g., one or more RF transceivers, antennas, radios, and/or other suitable hardware) to communicate wirelessly (e.g., via an RF interface) with one or more UEs 101, one or more other DUs 1003 (e.g., via RUs 1001 associated with DUs 1003), and/or any other suitable type of device. In the uplink direction, RU 1001 may receive traffic from UE 101 and/or another DU 1003 via the RF interface and may provide the traffic to DU 1003. In the downlink direction, RU 1001 may receive traffic from DU 1003, and may provide the traffic to UE 101 and/or another DU 1003.

RUs 1001 may, in some embodiments, be communicatively coupled to one or more MECs 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 101, via a respective RU 1001. For example, MEC 1007 may include one or more application servers that may host applications, services, devices or other facilities that may be made available to a UE 101.

For example, RU 1001-1 may route some traffic, from UE 101, to MEC 1007-1 instead of to a core network (e.g., via DU 1003 and CU 1005). MEC 1007-1 may process the traffic, perform one or more computations based on the received traffic, and may provide traffic to UE 101 via RU 1001-1. In this manner, ultra-low latency services may be provided to UE 101, as traffic does not need to traverse DU 1003, CU 1005, and an intervening backhaul network between DU network 1000 and the core network. In some embodiments, MEC 1007 may include, and/or may implement some or all of the functionality described above with respect to GTACS 105. Additionally, or alternatively, GTACS 105 may communicate with one or more MECs 1007, to indicate whether a particular UE 101 is authorized to receive services, data, or the like from MECs 1007.

Figure 11:
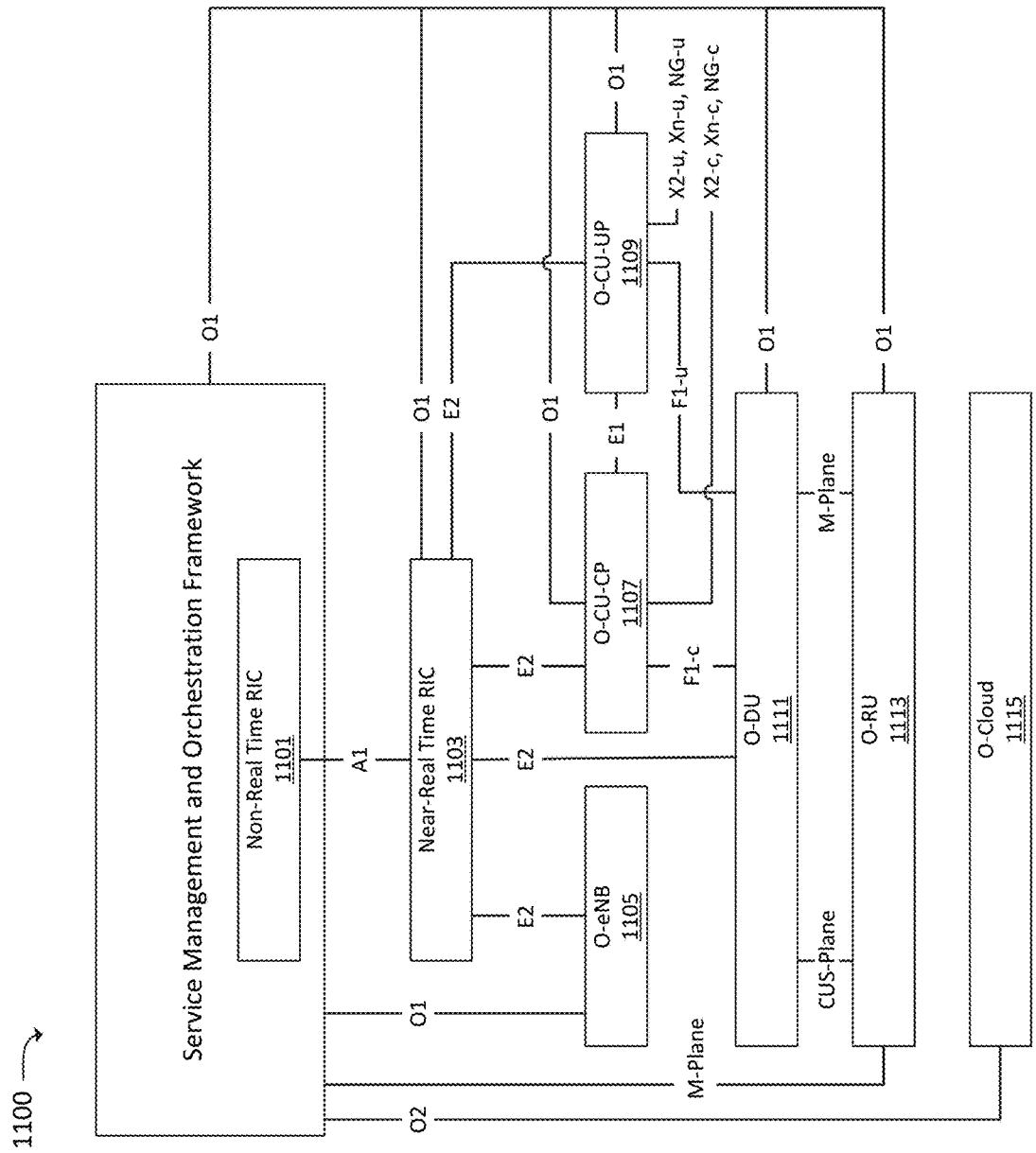
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 910, RAN 912, and/or DU network 1000. For example, RAN 910, RAN 912, and/or DU network 1000 may include one or more instances of O-RAN environment 1100, and/or one or more instances of O-RAN environment 1100 may implement RAN 910, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 101 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 1003 (e.g., O-DUs 1111). O-DU 1111 may be communicatively coupled to one or more RUs 1001, which may include and/or may be implemented by one or more O-RUs 1113. In some embodiments, O-Cloud 1115 may include or be implemented by one or more MECs 1007, which may provide services, and may be communicatively coupled, to O-CU-CP 1107, O-CU-UP 1109, O-DU 1111, and/or O-RU 1113 (e.g., via an O1 and/or O2 interface).

Figure 12:
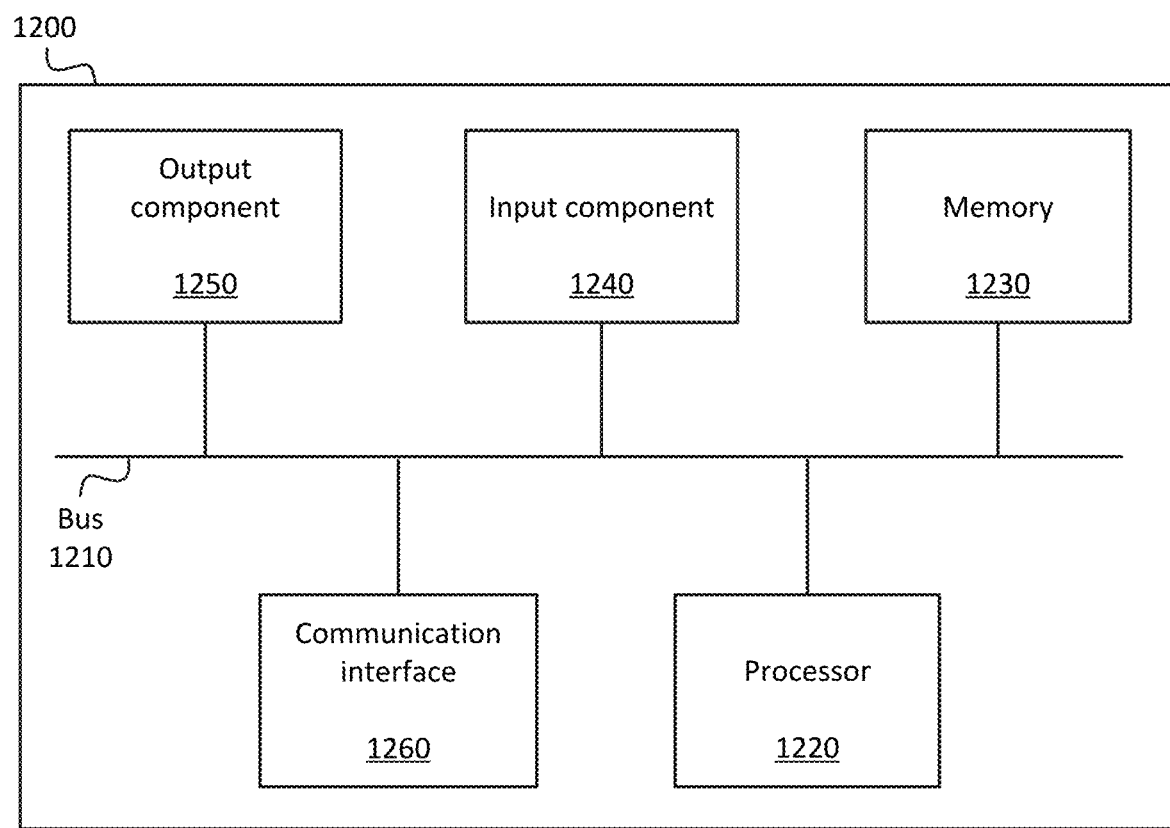
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more processors configured to:

receive an access control policy indicating a particular set of types of User Equipment ("UEs");
grant access to a particular UE when a type of the particular UE is included in the particular set of types indicated by the access control policy, wherein granting the access includes allowing the particular UE to execute a particular set of applications; and
deny access to the particular UE when the type of the particular UE is not included in the particular set of types indicated by the access control policy, wherein denying the access includes disabling the particular set of applications at the particular UE, wherein disabling the particular set of applications includes:
altering a display of one or more icons, in a user interface of the particular UE, that correspond to the particular set of disabled applications, wherein the altering includes replacing the one or more icons with one or more different icons,
receiving, via the user interface, a user selection of a particular icon associated with a particular application of the particular set of disabled applications, and
presenting, based on receiving the user selection of the particular icon, information indicating the particular access control policy based on which the access was denied, including an indication that the particular application was disabled based on the type of the particular UE.

2. The device of claim 1, wherein the access control policy further indicates times at which the particular UE is authorized to access the particular set of applications, wherein granting or denying access to the particular UE is further based on the times indicated by the access control policy.

3. The device of claim 1, wherein granting access to the particular UE further includes providing an indication to a system, that is communicatively coupled to the particular UE, that the system is authorized to provide particular information or services to the particular UE.

4. The device of claim 1, wherein granting access to the particular UE includes providing an indication to one or more elements of a radio access network ("RAN") that the RAN is authorized to provide wireless service to the particular UE.

5. The device of claim 1, wherein the access control policy includes an identifier of a plurality of UEs to which the particular access control policy applies, wherein the identifier of the plurality of UEs includes an identifier of at least the particular UE.

6. The device of claim 1, wherein altering the display of the one or more icons includes altering shading of the one or more icons.

7. The device of claim 1, wherein presenting the indication that the particular application was disabled based on the type of the particular UE includes presenting a pop-up notification when receiving the user selection of the particular icon.

8. A non-transitory computer-readable medium, storing a plurality of processor-executable instructions to:
receive an access control policy indicating a particular set of types of User Equipment ("UEs");
grant access to a particular UE when a type of the particular UE is included in the particular set of types indicated by the access control policy, wherein granting the access includes allowing the particular UE to execute a particular set of applications; and
deny access to the particular UE when the type of the particular UE is not included in the particular set of types indicated by the access control policy, wherein denying the access includes disabling the particular set of applications at the particular UE, wherein disabling the particular set of applications includes:
altering a display of one or more icons, in a user interface of the particular UE, that correspond to the particular set of disabled applications, wherein the altering includes replacing the one or more icons with one or more different icons,
receiving, via the user interface, a user selection of a particular icon associated with a particular application of the particular set of disabled applications, and
presenting, based on receiving the user selection of the particular icon, information indicating the particular access control policy based on which the access was denied, including an indication that the particular application was disabled based on the type of the particular UE.

9. The non-transitory computer-readable medium of claim 8, wherein the access control policy further indicates times at which the particular UE is authorized to access the particular set of applications, wherein granting or denying access to the particular UE is further based on the times indicated by the access control policy.

10. The non-transitory computer-readable medium of claim 8, wherein granting access to the particular UE further includes providing an indication to a system, that is communicatively coupled to the particular UE, that the system is authorized to provide particular information or services to the particular UE.

11. The non-transitory computer-readable medium of claim 8, wherein granting access to the particular UE includes providing an indication to one or more elements of a radio access network ("RAN") that the RAN is authorized to provide wireless service to the particular UE.

12. The non-transitory computer-readable medium of claim 8, wherein the access control policy includes an identifier of a plurality of UEs to which the particular access control policy applies, wherein the identifier of the plurality of UEs includes an identifier of at least the particular UE.

13. The non-transitory computer-readable medium of claim 8, wherein altering the display of the one or more icons includes altering shading of the one or more icons.

14. The non-transitory computer-readable medium of claim 8, wherein presenting the indication that the particular application was disabled based on the type of the particular UE includes presenting a pop-up notification when receiving the user selection of the particular icon.

15. A method, comprising:
receiving an access control policy indicating a particular set of types of User Equipment ("UEs");
granting access to a particular UE when a type of the particular UE is included in the particular set of types indicated by the access control policy, wherein granting the access includes allowing the particular UE to execute a particular set of applications; and
denying access to the particular UE when the type of the particular UE is not included in the particular set of types indicated by the access control policy, wherein denying the access includes disabling the particular set of applications at the particular UE, wherein disabling the particular set of applications includes:
altering a display of one or more icons, in a user interface of the particular UE, that correspond to the particular set of disabled applications, wherein the altering includes replacing the one or more icons with one or more different icons, receiving, via the user interface, a user selection of a particular icon associated with a particular application of the particular set of disabled applications, and presenting, based on receiving the user selection of the particular icon, information indicating the particular access control policy based on which the access was denied, including an indication that the particular application was disabled based on the type of the particular UE.

16. The method of claim 15, wherein the access control policy further indicates times at which the particular UE is authorized to access the particular set of applications, wherein granting or denying access to the particular UE is further based on the times indicated by the access control policy.

17. The method of claim 15, wherein granting access to the particular UE further includes providing an indication to a system, that is communicatively coupled to the particular UE, that the system is authorized to provide particular information or services to the particular UE.

18. The method of claim 15, wherein granting access to the particular UE includes providing an indication to one or more elements of a radio access network ("RAN") that the RAN is authorized to provide wireless service to the particular UE.

19. The method of claim 15, wherein the access control policy includes an identifier of a plurality of UEs to which the particular access control policy applies, wherein the identifier of the plurality of UEs includes an identifier of at least the particular UE.

20. The method of claim 15, further comprising:

subsequently granting access to the particular UE; and based on subsequently granting access to the particular UE, providing a notification via the user interface that the particular set of applications are enabled.

* * * * *